(12) United States Patent
Mendonsa et al.

(10) Patent No.: US 8,953,279 B1
(45) Date of Patent: Feb. 10, 2015

(54) SERVO BURSTS HAVING AT LEAST THREE FREQUENCIES

(71) Applicant: Seagate Technology LLC, Cupertino, CA (US)

(72) Inventors: Riyan Mendonsa, Minneapolis, MN (US); Puskal Prasad Pokharel, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/221,889

(22) Filed: Mar. 21, 2014

(51) Int. Cl.
*G11B 5/596* (2006.01)

(52) U.S. Cl.
USPC .................................................. 360/77.08

(58) Field of Classification Search
None
See application file for complete search history.

(56) References Cited

U.S. PATENT DOCUMENTS

| | | | | |
|---|---|---|---|---|
| 5,786,958 A * | 7/1998 | Negishi et al. | ............. | 360/77.01 |
| 6,034,835 A * | 3/2000 | Serrano | ................ | 360/77.05 |
| 6,760,184 B1 * | 7/2004 | Cunningham | ............. | 360/77.08 |
| 7,230,790 B1 | 6/2007 | Mallary et al. | | |
| 7,253,984 B1 * | 8/2007 | Patapoutian et al. | ........... | 360/75 |
| 7,405,893 B2 | 7/2008 | Bi et al. | | |
| 2002/0114101 A1 | 8/2002 | Guzik et al. | | |

* cited by examiner

*Primary Examiner* — Paul Huber
(74) *Attorney, Agent, or Firm* — Hollingsworth Davis, LLC (57) ABSTRACT

At least three servo burst frequencies are simultaneously detected during a rotation of a disk using a read head. A position of the read head during the rotation is determined based on simultaneously reading at least two of the at least three servo burst frequencies.

16 Claims, 9 Drawing Sheets

SERVO BURSTS HAVING AT LEAST THREE FREQUENCIES

SUMMARY

Some embodiments involve a method of simultaneously detecting at least three servo burst frequencies during a rotation of a disk using a read head. A position of the read head during the rotation is determined based on simultaneously reading at least two of the at least three servo burst frequencies. Some embodiments involve an apparatus that comprises a controller capable of being coupled to a read head. The controller is configured to simultaneously detect at least three burst frequencies during a rotation of a disk using the read head and determine a position of the read head during the rotation based on simultaneously reading the at least two of the three burst frequencies.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The theoretical maximum areal density of current magnetic recording architectures is bounded by what is known as the superparamagnetic limit. The superparamagnetic limit relates to the tendency of magnetic grains to randomly flip magnetic orientation in response to thermal fluctuations, and defines a lower bound on the area in which an individual bit can be reliably stored. In order to address the superparamagnetic limit, technologies such as heat assisted magnetic recording (HAMR) and bit patterned media (BPM) and shingled writing are being developed to increase areal density beyond what is current possible with perpendicular architectures.

Whether areal density is increased using HAMR, BPM, or shingled writing, existing read transducers may have difficulty reading back narrower tracks used with these methods. For example, shrinking the read transducers in a cross-track direction may decrease signal-to-noise ratio. As a result, two-dimensional magnetic recording (TDMR) may be used to facilitate reading of the disk. TDMR employs multiple-dimension encoding of data that is subsequently decoded for processing multiple data tracks. In addition to increasing areal density, TDMR may provide increased read-back data rate with a reduced channel buffer if data from the multiple data tracks are read concurrently.

Generally, current hard disk devices utilize a read/write head (also referred to as a slider) with a single read transducer for reading data. Multiple read/write heads may be used, e.g., separate read/write heads positioned at top and bottom surfaces of one or more magnetic disks. New architectures are being proposed that use more than one read transducer per read/write head. These new architectures use multiple read transducers to read recording media that recorded at an increased areal density compared to current recording architectures (e.g., perpendicular recording media). These architectures may also employ multiple writers. Whether areal density is increased using HAMR, BPM, or shingled writing, existing read transducers may have difficulty reading back narrower tracks used with these methods. In some cases, the tracks may be narrower than a read head width. Shrinking the read transducers in a cross-track direction may decrease signal-to-noise ratio. Technologies such as TDMR may be used to facilitate reading of the disk using read transducers that are larger than the track. While the focus of TDMR architectures has been on processing user data, such technologies may also need adaptations to read back servo data from the disks.

Servo data, sometimes referred to as servo sectors, servo wedges, servo marks, etc., are located on a recordable medium (e.g., magnetic disk) of a hard drive. The servo wedges are used to enable a servo control system to determine precisely where on the recordable medium a read/write head is located. The servo sectors may be pre-formatted on the recordable medium during manufacturing. The servo wedges are generally interspersed on the hard drive between data sectors, which are partitions within a track used to store user data on the hard drive.

A conventional servo arrangement may be non-linear if it maintains the same track spacing as the track width gets narrower, and may not be able to operate properly in the non-linear regions. For example, the servo marks contain burst patterns that are offset from the track centers, and allow the servo controller to both determine whether the reader is offset from the track (e.g., position error) and by how much. However, for tracks narrower than the reader, the reader will be able to see three bursts at a given time. In a standard pattern of alternating bursts, the reader will see two of the same type of bursts at the same time which may lead to non-linearities.

Using at least three distinct burst frequencies in consecutive tracks, the reader may be able to capture the data from all the bursts it passes over. Signal processing and/or filtering techniques can be used to distinguish between the burst frequencies.—According to various embodiments, at least three burst frequencies are simultaneously detected using a read head during a rotation of a disk. A position of the read head is determined during the rotation based on simultaneously reading at least two of the three burst frequencies.

Figure 1A:
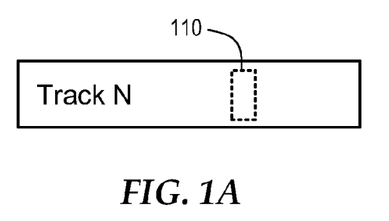
FIGS. 1A-1D illustrates different reader sizes on tracks of a memory device according to various embodiments.
Figure 1B:
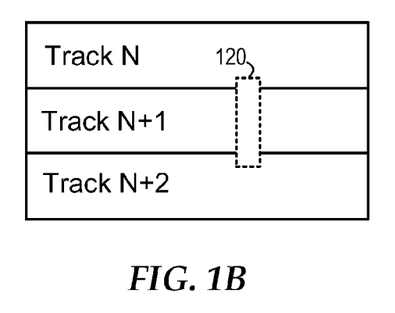
Figure 1C:
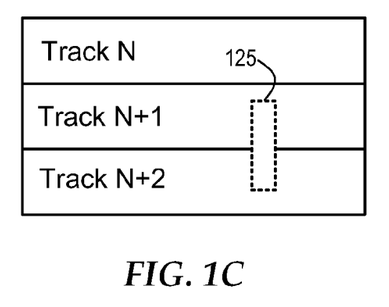
Figure 1D:
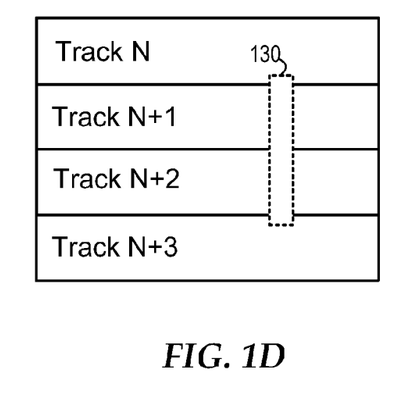

Embodiments described herein may be used to determine a position of read heads of various sizes in comparison to tracks of a memory device. In reference now to FIGS. 1A-1D, a diagram illustrates different reader sizes on tracks of a memory device. The tracks may represent data tracks and/or servo tracks, for example. FIG. 1A shows a reader 110 that has a width less than the width of a track. FIGS. 1B and 1C show readers 120, 125 that have a width greater than a track, for example a width of 1.5 tracks. The readers in FIGS. 1B and 1C are in different positions over the tracks. In FIG. 1A the reader 120 is substantially centered over track N+1 and is also overlapping tracks N and N+2. In FIG. 1C the reader 125 is in substantially in-between tracks N+1 and N+2. FIG. 1D illustrates a reader 130 that has a width greater than two tracks of the memory device. Reader 130 is shown overlapping Tracks N, N+1, N+2, and N+3. In some cases, reader 130 may overlap three tracks.

Figure 2:
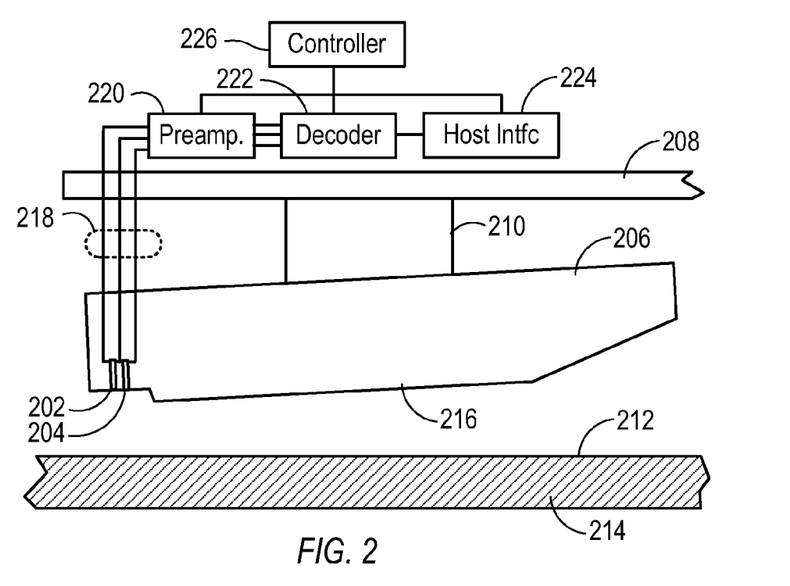
FIG. 2 displays a hard disk data storage device in accordance with some implementations.

The read transducers shown in FIGS. 1A-1D may be part of a hard disk data storage device. Details of such a device according to an example embodiment are shown in FIG. 2. Generally, read transducers 202, 204 are housed at a trailing edge of a slider 206, also sometimes referred to as a read/write head. The slider 206 is coupled to arm 208 by way of a suspension 210 that allows some relative motion between the slider 206 and arm 208. In addition to the read transducers 202, 204, the slider 206 may include one or more write transducers (not shown), such as a write pole and coil. When the slider 206 is located over surface 212 of a magnetic disk 214, a flying height is maintained between the slider 206 and surface 212 by a downward force of arm 208. This downward force is counterbalanced by an air cushion that exists between the surface 212 and an air bearing surface 216 of the slider 206 when the disk 214 is rotating.

Changes in local magnetic field caused by the moving disk 214 induce a change in resistance of the read transducers 202, 204. The read transducers are coupled to a preamplifier 220 by way of signal lines 218. Generally, the preamplifier 220 amplifies and conditions the analog signals (which may include a two-dimensional signal) received via signal lines 218, the amplified signals being used for other processing modules such as decoder 222. The decoder 222 determines a digital output from the analog signals, the digital output being used by a host via host interface 224, as well as other system components (not shown). The processing of the signals and data is generally managed by a controller 226, which may include a microprocessor and other logic circuits.

Figure 3:
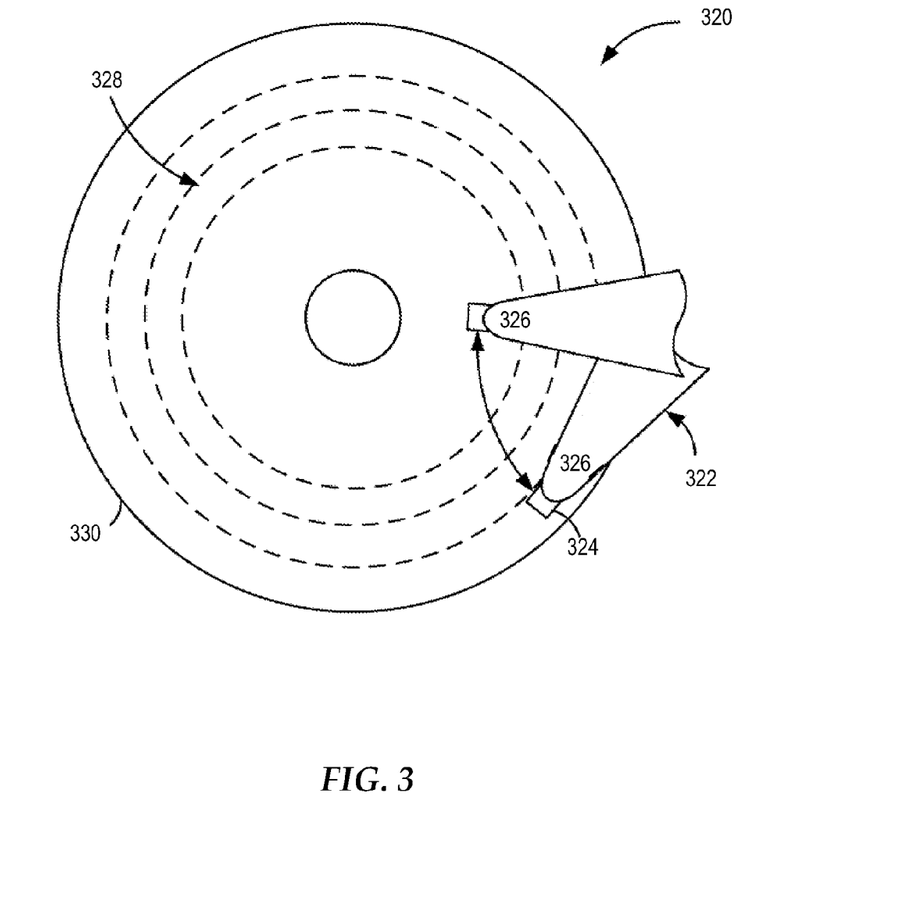
FIG. 3 displays a top view block representation of a data transducing assembly capable of being used in the data storage device of FIG. 2.

FIG. 3 displays a top view block representation of a data transducing assembly 320 capable of being used in the data storage device of FIG. 2. An actuating portion 322 of the data transducing assembly 320 has at least a slider 324 and load beam 326 that translate to access various data tracks 328 of a data storage media 330. As shown, rotation of the actuating portion 322 modifies the angular orientation of the slider 324 in relation to the data tracks 128 in what can be called the skew angle of the actuating portion 322. The relative positioning, size and rotation angles are for illustrative purposes only and should not be interpreted as limiting. In TDMR, multiple data transducers access adjacent data tracks to obtain data that is processed jointly to increase areal data bit density.

Figure 4:
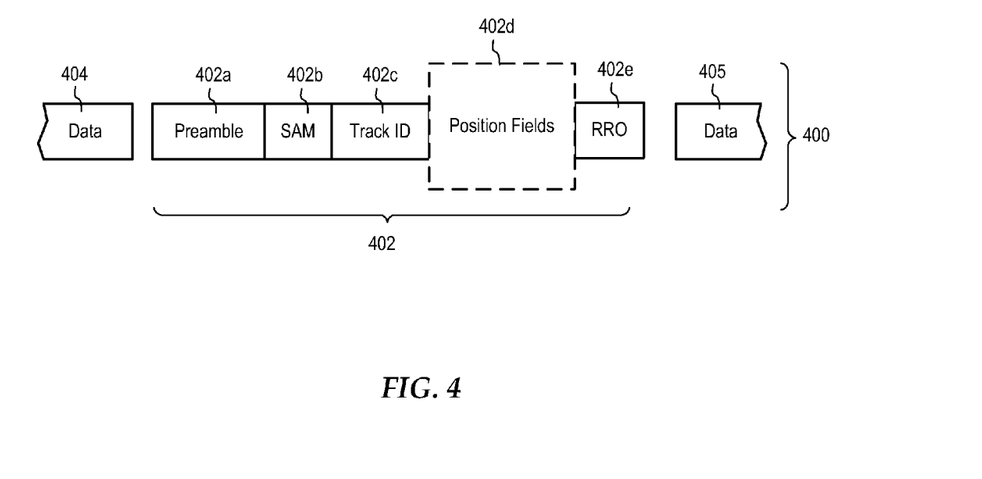
FIG. 4 is a block diagram that shows an arrangement of data within a servo wedge according to various embodiments.

As described previously, using TDMR may allow for increased throughput when writing servo and an improvement in format efficiency. In FIG. 4, a block diagram illustrates an arrangement of data within a servo wedge 402 according to various embodiments. The servo wedge 402 is located on a track 400 between a preceding data sector 404 and a following data sector 405. The data sectors 404, 405 store user data, and embodiments described herein may be used with any type and arrangement of data sectors. Generally, servo wedges will be located along a track, separated from each other by data sectors.

The servo wedge 402 includes a preamble 402a, servo address mark (SAM) 402b, servo address 402c (also referred to as track ID), position burst (PS) fields 402d, 402e, and one or more repeatable runout (RRO) fields 402f. The preamble 402a is a known magnetic pattern that is read back as a signal. The SAM 402b also includes a known pattern of bits that are read following the preamble 402a. Together, the preamble 402a and SAM 402b allow a read/write channel to positively determine that the beginning of the servo wedge 402 has been detected, and facilitates synchronizing the servo signal to read the subsequent data stored in the servo wedge 402.

In conventional servo wedge arrangements, the address field 402c includes a pattern (e.g., Gray code) that identifies the track in which the servo wedge 402 is located. The position fields 402d are burst fields that are used to determine a fractional position. For example, the position burst fields 402d facilitate fine alignment of the read/write head on the track. The RRO fields 402e also facilitate proper alignment of the read/write heads on a track by correcting for known runout errors.

FIGS. 5A, 6, 7, and 8 illustrate different configurations of the servo position fields using at least three distinct frequencies. In some cases, the frequencies are far enough apart at least to be able to be distinguishable from each other using the hardware and software available and/or close enough together so that there is negligible effect on amplitude based on frequency differences. In some cases, the frequencies have the same amplitude or similar amplitude as each other.

Figure 5A:
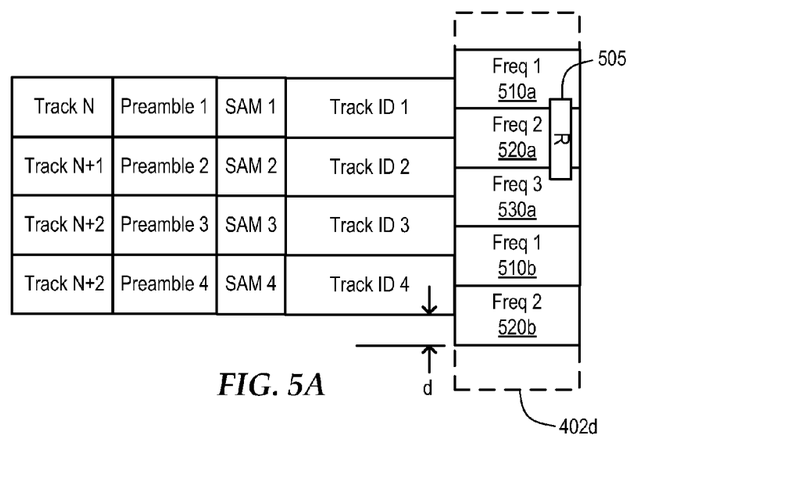
FIG. 5A illustrates a single set of servo position fields with three different frequencies.
Figure 5B:
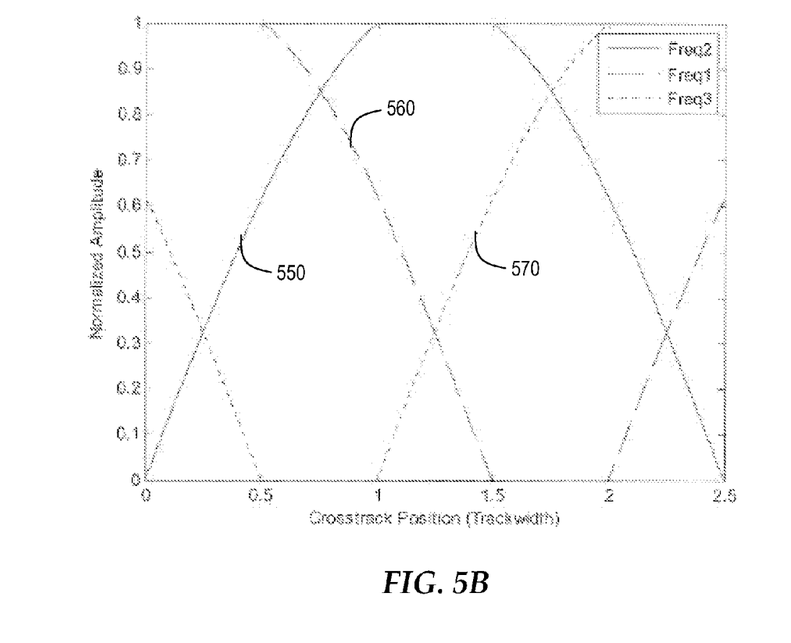
FIG. 5B is the estimated curves obtained from the servo position fields of FIG. 5A.

FIG. 5A shows a single set of servo position fields with three different frequencies, servo burst fields having frequency 1 510a, 510b, servo burst fields having frequency 2 520a, 520b, and servo burst fields having frequency 3 530a. The servo position fields are offset from the tracks by a cross-track displacement d. Reader 505 is substantially centered over servo burst field 520a with frequency 2. The reader 505 also can detect frequency 1 from servo burst field 510a and frequency 3 from servo burst field 530a. In some cases, two readers are used to read at least two of the three frequencies. The PES signal obtained from the position fields 402d illustrated in FIG. 5A can be estimated by the curves shown in FIG. 5B using the reader 505. According to various implementations, the middle curve 550 represents an amplitude associated with frequency 2. As shown, the reader 505 also detects frequency 1 at curve 560 and frequency 3 at curve 570.

Figure 6:
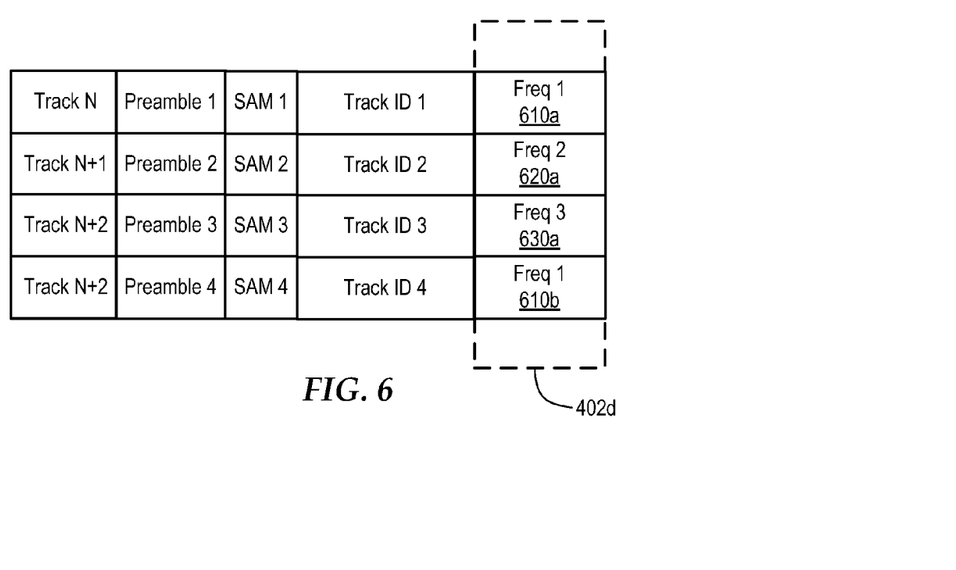
FIG. 6 shows a single set of servo position fields having three distinct frequencies that are substantially aligned with the tracks.

According to some embodiments, the servo burst fields 402d may not be offset from the tracks. FIG. 6 shows a single set of servo position fields 610a, 620a, 630a, 640a having three distinct frequencies that are substantially aligned with the tracks. According to various embodiments the servo burst fields are different widths and/or are a different width than the servo tracks and/or the data tracks.

Figure 7:
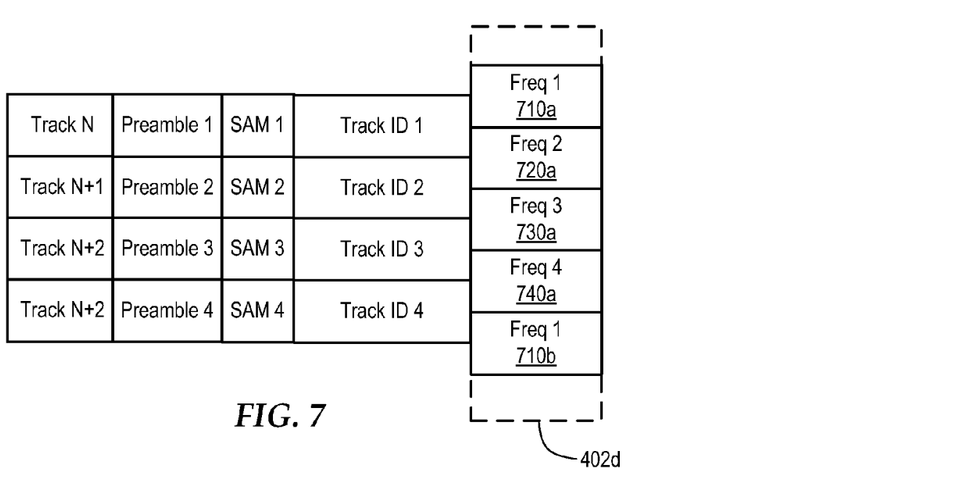
FIG. 7 illustrates a single set of servo burst fields having four distinct frequencies on consecutive tracks.

As described above, in some configurations (e.g., those where the read transducer is less than two tracks wide) more than three distinct frequencies are used. In other examples, if the width of the reader is more than two tracks wide, at least four distinct frequencies may be used. FIG. 7 illustrates a single set of servo burst fields 710a, 720a, 730a, 740a, 710b having four distinct frequencies on consecutive tracks.

Figure 8:
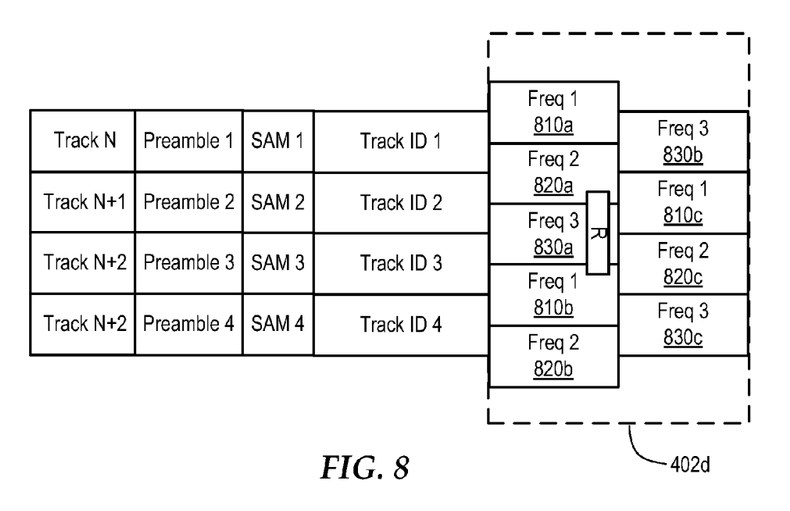
FIG. 8 shows a configuration having two sets of burst fields with three distinct frequencies.

According to various implementations, a second set of servo position bursts can be used to improve accuracy, for example. FIG. 8 shows a configuration having two sets of burst fields 810a, 820a, 830a, 810b, 820b, 830b, 810c, 820c, 830c with three frequencies. In some cases, the second set of bursts helps provides normalization information for the amplitude signals. This may be done because at least one frequency burst is substantially covered by the reader, and therefore is at max amplitude. As described above, a single set of burst fields may also be used in conjunction with means for determining a minimum and maximum of the burst amplitudes as the amplitude may change with fly height. In some cases, the preamble can have an amplitude substantially the same as the servo burst amplitudes. Thus the amplitude of the preamble of a servo wedge can be used as reference amplitude when reading the burst patterns of the servo wedge. This can allow the amplitude of the servo burst fields to be known before they are read, assuming the fly height does not significantly change from the time the preamble is read to the time the burst patterns are read.

Figure 9:
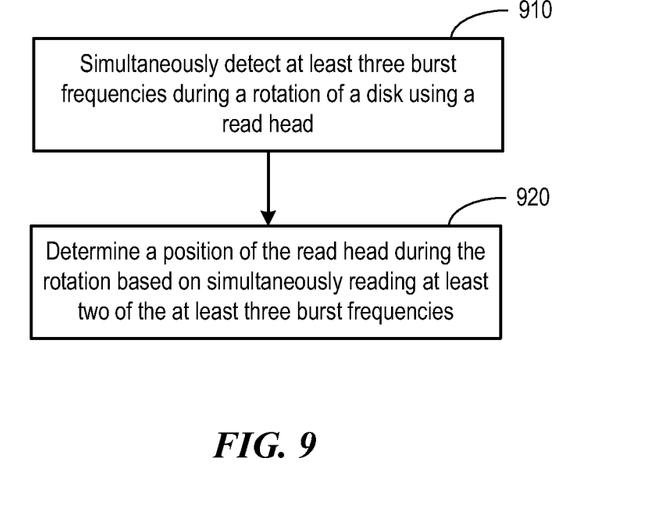
FIG. 9 is a flow diagram in describing detecting at least three burst frequencies accordance with various implementations.

FIG. 9 is a flow diagram in describing detecting at least three burst frequencies accordance with various implementations. At least three burst frequencies are simultaneously detected 910 during a rotation of a disk suing a read head. A position of the read head is determined 920 based on simultaneously reading at least two of the at least three burst frequencies. According to various embodiments, the position of the read head is determined relative to one or more tracks of the disk. In some cases, read head is wider than the width of the one or more tracks of the disk.

Figure 10:
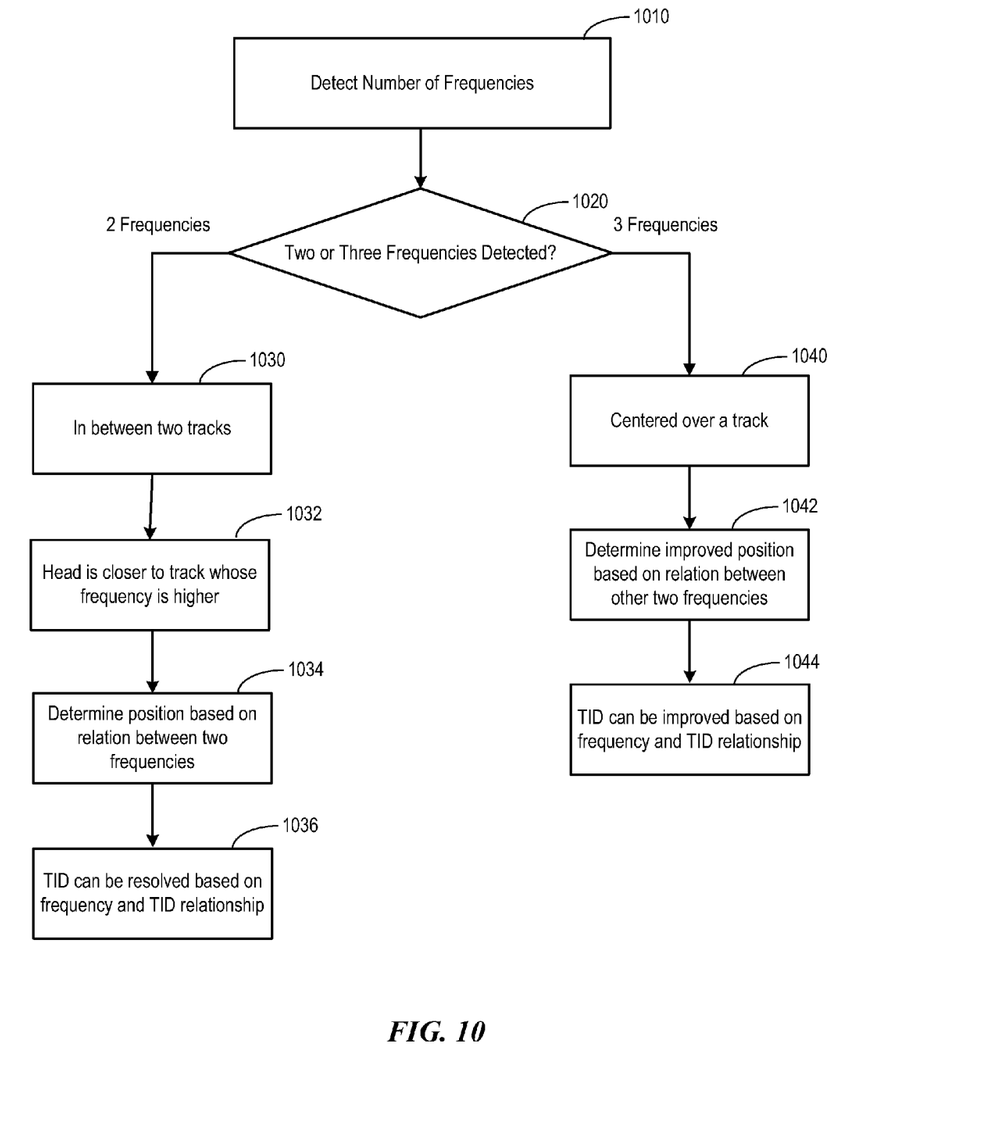
FIG. 10 shows a flow diagram describing determining a track ID based on detecting at least two of the at least three burst frequencies in accordance with embodiments described herein.

FIG. 10 shows a flow diagram describing determining a track ID based on detecting at least two of the at least three burst frequencies in accordance with embodiments described herein. This procedure assumes the read transducer encompasses fewer than two tracks, but may be larger than a single track. This procedure also assumes that the burst patterns are aligned with the track, such that reading a full amplitude signal of one burst frequency indicates that the reader is centered over the associated track.

A number of frequencies is detected 1010 while traversing the burst pattern(s). If it is determined 1020 that two frequencies are detected, it is determined 1030 that the reader is between a first track and a second track. It is determined 1032 whether the first track or the second track has a higher frequency. If it is determined 1032 that the first track has a higher frequency, it is determined 1032 that the reader is closer to the first track based on relative amplitude of the higher frequency component being higher than that of the lower frequency component. If it is determined 1032 that the second track has a higher frequency, it is determined 1032 that the reader is closer to the second track based on relative amplitude of the higher frequency component being higher than that of the lower frequency component. The relative amplitude components can be determined, for example, by examining a frequency response of the combined burst signals.

A track ID can be determined 1036 based on a relationship between the frequency having the highest amplitude and the track ID associated with that frequency. So if the higher track ID is associated with the higher frequency, the higher track ID is selected if the higher frequency component dominates. If the lower frequency component dominates, then the lower track ID is selected.

If it is determined 1020 that there are three distinct frequencies, it is determined 1040 that the reader is substantially centered over a track. An improved position can be determined 1042 based on a relation between the other two frequencies. Again, this can be done using a frequency response of the burst signals. Because the reader is substantially centered over the track, there should confidence that the detected track ID is correct, assuming there were no bit errors. If there are bit errors, then the detection of track ID can be improved 1044 based on a relationship between the center frequency and the track ID. For example, if the previously read track was centered over a frequency 1 burst pattern and when the next, adjacent track is read it is found to be centered over frequency 2 burst pattern as expected, then if there is a bit error in the track ID, it may be resolved based on reading the expected burst pattern along with the particulars of the Gray code.

In an embodiment where the burst patterns are not aligned with the track centers, the procedure in FIG. 10 could be modified to account for this. For example, if two frequencies are detected, then it is assumed that the reader is substantially centered, and it is otherwise assumed to be not substantially centered if three frequencies are detected. In such a case, a particular ratio of frequency amplitude components can be used to determine how closely aligned the reader is. Also, if a second set of downtrack burst patterns are used (e.g., one aligned with the track and the other not aligned), then a combination of procedures could be used to refine the position error estimate.

It should also be noted that the determinations noted above in the procedure shown FIG. 10 could alternately use the lower frequency for selection, or a middle frequency of more than two frequencies are detected. Other signal characteristics could also be used to aid in such determination, such as relative phase angle. Further, the procedure may be modified to account for a reader that encompasses more than two tracks but less than three. In such a case, the left branch of the flowchart would be entered if three frequencies were detected, and the right branch would be selected if four frequencies were detected. Whether or not these branches indicate track alignment would depend on whether the burst marks are aligned with the track centers or not as described above.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to in data storage devices as described above.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method comprising:
   simultaneously detecting at least three servo burst frequencies during a rotation of a disk using a read head; and determining a position of the read head relative to a track of the disk during the rotation based on simultaneously reading at least two of the at least three servo burst frequencies, the read head being wider than a width of the track of the disk.

2. The method of claim 1, further comprising determining whether two or three burst frequencies are simultaneously read.

3. The method of claim 2, further comprising, if it is determined that two burst frequencies are read, determining that a read head is between two different tracks.

4. The method of claim 2, further comprising, if it is determined that three burst frequencies are read, determining that a read head is substantially over the track.

5. The method of claim 1, wherein each of the at least three servo burst frequency is associated with respective consecutive tracks.

6. The method of claim 1, wherein the at least three servo burst frequencies are each associated with a respective servo burst field.

7. The method of claim 1, wherein the read head is has a width greater than at least two tracks.

8. The method of claim 1, wherein the read head has a width greater than at least three tracks.

9. The method of claim 1, further comprising:
determining a first amplitude of one of the at least three burst frequencies; and
using the at least one amplitude to normalize amplitudes of others of the at least three burst frequencies.

10. The method of claim 1, further comprising:
simultaneously detecting at least four burst frequencies during a rotation of a disk using a read head; and
determining a position of the read head during the rotation based on simultaneously reading at least three of the at least four burst frequencies.

11. An apparatus comprising,
a controller capable of being coupled to a reader, the controller configured to:
detect at least three servo frequencies at the same time during one rotation of a disk using the reader; and
determine a position of the reader relative to a track of the disk during the one rotation based on reading at least two of the three servo frequencies at the same time, the reader being wider than a width of the track of the disk.

12. The apparatus of claim 11, wherein the controller is configured to determine whether two or three servo frequencies are simultaneously read.

13. The apparatus of claim 11, wherein the at least three servo frequencies are each associated with a respective servo burst field and there are at least two sets of servo burst fields associated with a track.

14. The apparatus of claim 11, wherein the reader is has a width greater than at least two tracks.

15. The apparatus of claim 11, wherein the reader as a width greater than at least three tracks.

16. The apparatus of claim 11, wherein the controller is configured to:
determine a first amplitude of one of the at least three servo frequencies; and
use the at least one amplitude to normalize amplitudes of others of the at least three servo frequencies.

* * * * *